Sept. 27, 1960          G. D. LINE                 2,954,015
                   LUBRICANT DELIVERY CONTROL
                      Filed Oct. 23, 1958

INVENTOR.
GERALD D. LINE
BY
ATTORNEYS

United States Patent Office 2,954,015
Patented Sept. 27, 1960

2,954,015
LUBRICANT DELIVERY CONTROL

Gerald D. Line, Royal Oak, Mich., assignor to Eaton Manufacturing Company, Cleveland, Ohio, a corporation of Ohio Filed Oct. 23, 1958, Ser. No. 769,135

14 Claims. (Cl. 123—90)

This invention relates to lubricant delivery controls for use in lubricating systems for internal combustion engines, pumps, or the like, wherein lubricant is supplied to portions of the valve operating mechanism through tappet-reciprocated push rods.

The lubricant delivery controls of this invention are embodied in the lash compensating tappets or valve lifters of the valve operating mechanisms and are adapted to meter or control the delivery of lubricating oil from supply passages, or from reservoir chambers in the tappets themselves, through hollow push rods to remote bearing surfaces such as are found in the rocker arms of valve linkages.

As such, it is an object of this invention to provide an oil control or metering means which presents a substantially constant metering orifice to oil under pressure within the tappet, and which also acts in the nature of a non-return or check valve when the engine or the like is idle, thereby preventing drain-down of oil and settling of unclean oil and foreign matter into the tappet.

Another object is to provide a novel metering means within the reservoir closure or push rod receiving socket member of a hydraulic valve lifter, lash eliminating mechanical tappet or the like, and which metering means comprises a flow control element loosely retained in a passage of the socket member so that the control element, although movable within the passage, always defines a substantially constant metering space between itself and the wall of the passage.

A further object of this invention is the provision of an improved lubricant delivery control of the above nature which is readily adapted to use as a part of existing hydraulic tappets or valve lifters, and which in one form may be used in either vertical or horizontal positions as in "pancake" or aircraft engines without disturbing the check valve action of the control.

Additionally the invention aims to provide a lubricant control or metering means which is efficient and reliable as well as self-cleaning in operation, and which is simple and rugged of construction, thereby assuring precision and ease of assembly in its manufacture.

The manner in which these and other objects are attained will become apparent from the following description of the construction in which the invention resides, taken in conjunction with the accompanying drawings, in which.

Figure 2:
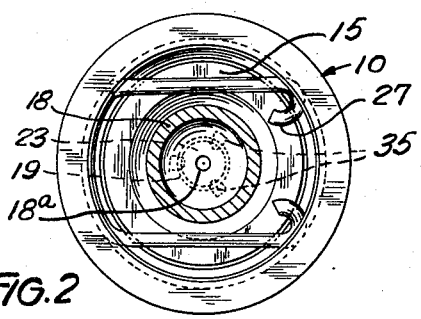
Fig. 2 is a top plan view of the hydraulic valve lifter of Fig. 1.
Figure 3:
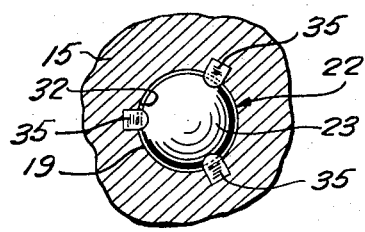
Fig. 3 is an enlarged section taken on line 3—3 of Fig. 1 and showing the metering space.
Figure 1:
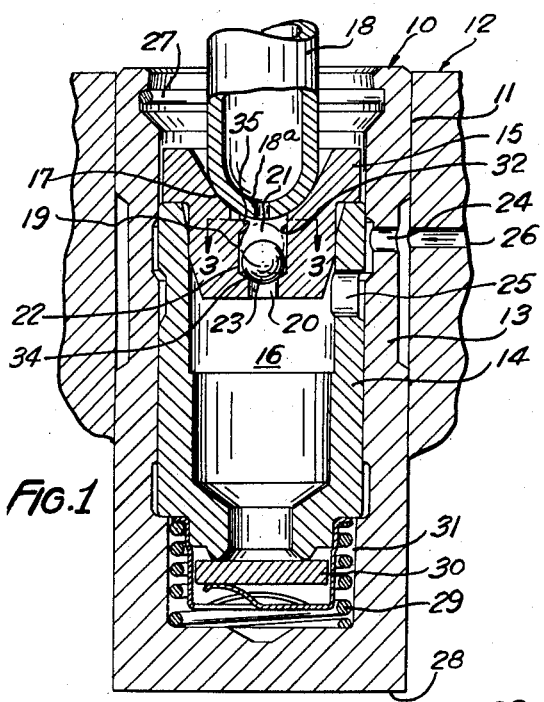
Fig. 1 is a vertical sectional view of a hydraulic valve lifter embodying a preferred form of the invention and showing a portion of an associated push rod.

The lubricant delivery controls of this invention find their application particularly in engine valve linkages employing lash adjusters or tappets. By way of example, the invention is shown as being embodied in a tappet of the hydraulic valve lifter type which is illustrated in Fig. 1. The valve lifter or tappet 10 of such a linkage is reciprocable in a guide bore 11 in an internal combustion engine block or the like, a portion of the latter being indicated generally at 12, and is of the hydraulic or lash eliminating variety.

The tappet 10 generally comprises a cup-shaped body 13 and a cup-shaped plunger 14 reciprocable therein. A socket member 15 is carried by the plunger 14 and serves as a closure for an oil reservoir chamber 16 in the plunger 14. The socket member 15 has a spherical concave socket 17 therein for receiving the end of a hollow push rod 18, and also has a passage 19 therethrough and which passage includes an inner opening 20 communicating with the chamber 16 and an outer opening 21 communicating with the socket 17. The latter opening is in substantial alignment with a corresponding opening 18a in the end of the hollow push rod 18, thereby providing an oilway from the chamber 16 into the push rod.

Oil, under the pressure of the engine lubricating system, passes from the reservoir chamber 16 through the passage 19 wherein it is metered through the space or orifice 22 defined between the wall of the passage and a movable metering element or valve member here shown in the form of a ball 23 disposed therein. From the passage 19 the metered lubricating oil passes through the hollow push rod 18 to a remote bearing surface or surfaces such as are found in the rocker arm assemblies of conventional overhead valve arrangements.

In the main, the tappet 10, seen in Fig. 1, is illustrative of the form of hydraulic valve lifters into which the invention is advantageously incorporated and is of the type disclosed more fully by United States Patent No. 2,761,435. The body 13 and the plunger 14, reciprocable therein, have oil inlet ports 24, 25 respectively through which lubricating oil is admitted to the reservoir chamber 16. The guide bore 11 is provided with an oil supply passage 26, which passage communicates with an oil gallery forming a part of the pressure lubricating system. Oil from the supply passage 26 enters the chamber 16 via inlet ports 24 and 25, maintaining the oil in the chamber at substantially the pressure of the lubricating system, when in operation.

The body 13 of the tappet is provided with a cam-engaging face 28 and is adapted to be reciprocated in the bore 19 by the action of a conventional valve operating cam against that face. During each reciprocation of the tappet 10 and push rod 18 and when the valve operated thereby is seated, a spring 29 forces the plunger 14 and the tappet body 13 apart until any valve lash present is taken up. The reciprocation of the plunger 14 within the body 13 allows oil to flow from the reservoir chamber 16, past the check valve 30 into the enlarged cushion chamber 31, thereby eliminating all lash or end play in the length of the valve operating linkage. A spring clip or retainer 27 is provided to prevent disassociation of the plunger 14 and the body 13 when the tappet 10 is not in an installed condition.

The feeding or metering of oil and the check valve functions of the lubricant delivery controls of this invention are governed by the novel relation of the movable element or ball 23 to the closure or socket member 15. The passage 19 is defined by a substantially cylindrical wall or surface 32. Formed in the socket or closure member 15 and surrounding the inner opening 20 is an annular seat 34.

Extending into the passage 19, and partly across the outer opening 21, there are provided upset projections or stake elements 35. The projections 35 are retaining means for keeping or confining the movable metering element or ball 23 loosely within the passage 19, where it is free to move from an unseated or open position (seen in dotted lines in Fig. 1) adjacent the projections 35 to the full-line seated or closed position in engagement with the annular seat 34. Although three of such projections 35 are shown, a single upset projection has been found sufficient.

Ball 23 is of such a size that there is an annular opening or metering space 22 defined between the periphery of the ball and the cylindrical wall or surface 32 of the passage 19, through which space the lubricating oil may pass. When the lubricating oil in the system, and hence in chamber 16, is under pressure, as when the engine or the like is running, the ball 23 is lifted or moved away from the seat 34 under the influence of that oil under pressure, thereby allowing the oil to be metered past the ball through the annular space 22 with no metering being effected between the ball and the seat.

It should be observed here that the opening at the metering space 22 is of less cross-sectional area than the opening 20 or the opening 21 with the retaining projections 35 thereacross. The oils therefore fed or metered only by the restricted space or orifice 22 which remains substantially constant for all unseated positions of the ball 23 within the pasasge 19. Thus, although the ball 23 be held against the retaining means by the oil pressure, the amount of oil delivered is governed by the metering orifice 22 alone.

When the engine, pump, or the like, using this invention, is idle and the lubricating system is not under pressure, the ball 23 will engage the annular seat 34 because of its own weight and the weight of the oil above it, thereby closing the inner opening 20 against the return of that oil to the interior of the tappet 10. This nonreturn or check valve feature prevents foreign matter from entering and damaging the precision fit of the various parts of the hydraulic valve lifter. Further, because the oil is retained in the hollow push rod as an initial quantity, less time is required for the supply of lubricant to be reestablished at the above-mentioned remote bearing surfaces upon a subsequent starting of the engine. The check valve action also helps to maintain a supply of oil in the reservoir during idle periods, leading to quieter starting.

The relative freedom of motion of the ball 23 within the passage 19 gives the device a self-cleaning characteristic. That is to say, upon being moved away from the seat 34, under the influence of the oil, the ball 23 will clear passage 19 of any sediment which may have collected or settled while the engine was idle, thereby assuring an unclogged metering orifice 22.

Figure 4:
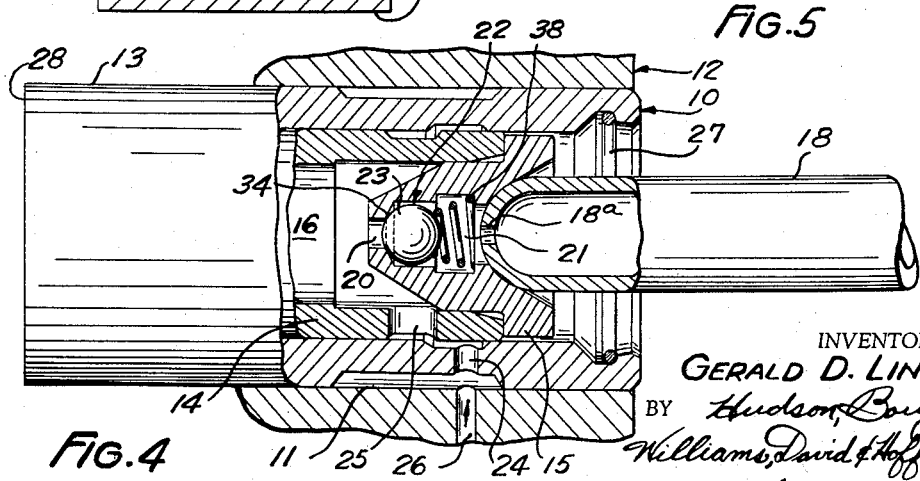
Fig. 4 is a view partly in section and partly in elevation showing a form of the invention utilizing a coil spring as the retaining means and particularly suited to horizontal operation.

Turning now to the embodiment of the invention seen in Fig. 4, there is illustrated a hydraulic tappet similar to that of Fig. 1, but with a lubricant delivery control especially suited for use in a horizontal position. In this form of the invention, the ball 23 is urged toward the seat 34 by a light coil spring 38. The spring 38 acts as a retaining means to keep the ball within the passage 19, and is of sufficient strength to maintain the ball 23 against the seat 34 when the engine is idle. When in use, however, oil under pressure in the chamber 16 will move the ball 23 away from the seat 34 to such an extent that the controlling restriction on the passage of the oil is provided by the annular metering space or orifice 22.

It can readily be seen that no reliance need be placed on gravity to cause the ball 23 to act as a nonreturn or check valve. This form of the invention is therefore effective in horizontal or "pancake" engines having horizontally disposed push rods and tappets.

Figure 5:
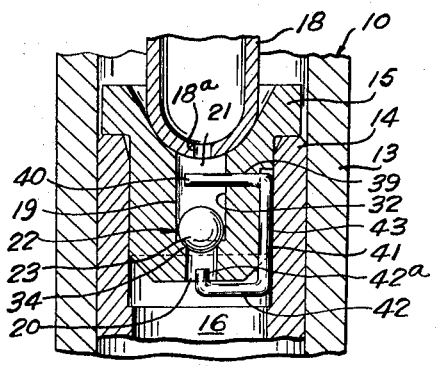
Fig. 5 is a sectional view of an embodiment of the invention using a U-shaped pin as the retaining means.

A further embodiment is seen in Fig. 5 and comprises a socket member 15 similar to that of Fig. 1 with the exception of the ball retaining means. In this embodiment the member 15 is provided with a transverse opening 39 through which a first or straight leg 40 of a substantially U-shaped pin 41 projects, forming a stop or retaining means for the ball 23. The pin 41 is provided with a second or bent leg 42 which serves to retain the pin in position. The leg 42 extends radially or transversely across the inner end of the member 15 and has an inturned end portion 42ª projecting axially into the opening 20. The connecting portion 43 of the U-shaped pin 41 is recessed in the member 15, as by lying in a groove thereof, and is retained by the wall of the plunger 14.

From the foregoing descriptions of the several embodiments, it will be apparent that this invention provides improved lubricant delivery controls having movable metering elements by which a check valve action is achieved while maintaining the metering orifice substantially constant.

Although several forms of the invention have been illustrated and described herein, it should be understood that the invention is susceptible of various modifications and adaptations falling within the scope of the appended claims.

Having thus described my invention, I claim:

1. In a lubricant supply means for engine valve linkage comprising a push rod having an oil conducting passage, means defining a chamber containing oil under pressure, movable thrust means interposed between said chamber and push rod for transmitting thrust to the latter, said thrust means having axial wall means defining a delivery passage for connecting said chamber with said conducting passage, a movable control element in said delivery passage, said control element having peripheral portions thereof in radially spaced relation to said wall means for metering a flow of oil from said chamber to said conducting passage, and retaining means in said delivery passage for preventing said control element from obstructing said conducting passage.

2. A lubricant supply means as defined in claim 1 and including a seat in said passage, said movable control element being adapted to engage said seat for closing said delivery passage against a flow of oil from said conducting passage to said chamber.

3. In a hydraulic tappet having a chamber for oil under pressure and a chamber closure member adapted to meter oil from said chamber to a remote point through a hollow push rod, said closure member having a passage with an inner opening communicating with said chamber and an outer opening for communication with said hollow push rod, a seat in said passage surrounding said inner opening, and a movable element retained in said passage and adapted to engage said seat, said element being adapted to be moved away from said seat under the influence of said oil under pressure, said element and said closure member defining a metering orifice of substantially constant area therebetween, and said outer opening being always of greater size than said metering orifice.

4. In a hydraulic tappet having a reservoir chamber for oil under pressure and a chamber closure member adapted to meter oil from said chamber to a remote point through a hollow push rod, said closure member having a push rod receiving socket portion formed thereon and having a passage with an inner opening communicating with said chamber and terminating in an outer opening in said socket portion, said passage being defined by a substantially cylindrical surface, a seat in said passage surrounding said inner opening, a movable element disposed in said passage and adapted to engage said seat and thereby close said inner opening, and retaining means on said closure member for retaining said movable element in said passage, said movable element and said surface defining a substantially constant metering space therebetween, said movable member being adapted to be moved away from said seat under the influence of said oil under pressure to open said inner opening, said oil being metered through said metering space and passed through said outer opening into said hollow push rod, and said outer opening being always of greater size than said metering space.

5. The hydraulic tappet of claim 4 in which said movable member is a ball and said retaining means comprises a projection extending into said passage and partially across said outer opening.

6. The hydraulic tappet of claim 4 in which said movable member is a ball and said retaining means comprises a substantially U-shaped pin having one leg extending through a transverse opening in said closure member and projecting into said passage.

7. The hydraulic tappet of claim 4 and including a spring means in said passage urging said movable member toward said seat.

8. A lubricant delivery control of the character described comprising a socket member having a socket for receiving a hollow push rod and having a reservoir chamber closing face, said socket member having a passage therethrough having a first opening in said socket and having a second opening in said chamber closing face, a seat formed on said member in said passage and surrounding said second opening, a movable element loosely retained in said passage and adapted to abut said seat, said element defining in said passage a metering space, said space being substantially constant for all positions of said element in said passage and said first opening being free of obstruction by said element whereby said metering space is always smaller than said first opening.

9. A lubricant delivery control of the character described comprising a member having a socket for receiving a hollow push rod and having a reservoir closing face, said member having a passage therethrough having a first opening in said socket and having a second opening in said reservoir closing face, an annular seat formed on said member in said passage and surrounding said second opening, a movable ball disposed in said passage and adapted to abut said seat to close said second opening, retaining means on said member for retaining said ball in said passage and for preventing said ball from obstructing said first opening, said ball defining in said passage a metering space, said space being substantially constant for all positions of the ball in said passage, said ball being adapted to be moved away from said seat by oil under pressure in said reservoir.

10. The lubricant delivery control of claim 9 in which said retaining means comprises upset projections in said passage.

11. The lubricant delivery control of claim 9 in which said retaining means comprises a substantially U-shaped pin projecting through a transverse opening in said member into said passage.

12. The lubricant delivery control of claim 9 wherein said retaining means includes a coil spring urging said element toward said seat.

13. In a lubricant supply means for enginge valve linkage comprising a push rod having an oil conducting passage, a lash compensating tappet having a body portion and a push rod receiving socket portion for transmitting thrust to said push rod, said tappet having wall means defining an oil delivery passage therethrough for communication with said oil conducting passage, a movable control element in said oil delivery passage, said control element having peripheral portions in spaced relation to said wall means defining a substantially constant metering orifice therebetween for controlling a flow of oil through said passages, and the amount of oil delivered being governed by said metering orifice alone.

14. A lubricant supply means as defined in claim 13 and an annular seat in said oil delivery passage, said seat and said control element being cooperable to prevent flow of oil in one direction, said control element being movable away from said seat by a flow of oil in an opposite direction, said metering orifice being substantially constant in area for all positions of said movable control element.

References Cited in the file of this patent

UNITED STATES PATENTS

| | | |
|---|---|---|
| 2,739,580 | Brown | Mar. 27, 1956 |
| 2,818,050 | Papenguth | Dec. 31, 1957 |
| 2,840,063 | Purchas | June 24, 1958 |
| 2,845,914 | Cobo | Aug. 5, 1958 |
| 2,857,895 | Scheibe | Oct. 28, 1958 |